United States Patent [19]
Delp

[11] Patent Number: 6,081,276
[45] Date of Patent: Jun. 27, 2000

[54] METHOD AND APPARATUS FOR CREATING A COLOR NAME DICTIONARY AND FOR QUERYING AN IMAGE BY COLOR NAME

[75] Inventor: Helen R. Delp, Rochester, Minn.

[73] Assignee: International Business Machines Corporation, Armonk, N.Y.

[21] Appl. No.: 08/749,150

[22] Filed: Nov. 14, 1996

[51] Int. Cl.[7] ....................................................... H04N 1/46
[52] U.S. Cl. ............................................................. 345/431
[58] Field of Search ................................... 345/431, 418, 345/419, 429, 150, 152, 153

[56] References Cited

U.S. PATENT DOCUMENTS

| | | | |
|---|---|---|---|
| 3,751,829 | 8/1973 | Foss | 35/28.3 |
| 4,439,759 | 3/1984 | Fleming et al. | 340/703 |
| 4,500,908 | 2/1985 | Mandeberg | 358/11 |
| 4,740,833 | 4/1988 | Shiota et al. | 358/80 |
| 4,745,555 | 5/1988 | Connelly et al. | 364/470 |
| 4,843,573 | 6/1989 | Taylor et al. | 364/521 |
| 4,985,853 | 1/1991 | Taylor et al. | 364/521 |
| 5,049,986 | 9/1991 | Aono et al. | 358/80 |
| 5,233,684 | 8/1993 | Ulichney | 345/431 |
| 5,243,414 | 9/1993 | Dalrymple et al. | 358/500 |
| 5,254,977 | 10/1993 | MacDonald | 345/150 |
| 5,255,081 | 10/1993 | Miyamoto et al. | 358/41 |
| 5,258,826 | 11/1993 | Wakeland et al. | 358/12 |
| 5,309,257 | 5/1994 | Bonino et al. | 358/504 |
| 5,315,694 | 5/1994 | Kasano | 345/431 |
| 5,334,992 | 8/1994 | Rochat et al. | 345/22 |
| 5,343,311 | 8/1994 | Morag et al. | 358/518 |
| 5,365,252 | 11/1994 | Lo | 345/153 |
| 5,416,890 | 5/1995 | Beretta | 345/431 |
| 5,432,893 | 7/1995 | Blasubramanian et al. | 345/431 |
| 5,463,480 | 10/1995 | MacDonald et al. | 358/520 |
| 5,467,110 | 11/1995 | White et al. | 345/199 |
| 5,489,921 | 2/1996 | Dorff et al. | 345/153 |
| 5,502,458 | 3/1996 | Braudaway et al. | 345/431 |

FOREIGN PATENT DOCUMENTS

| | | |
|---|---|---|
| 0295689 | 12/1988 | European Pat. Off. . |
| 0385449 | 9/1990 | European Pat. Off. . |
| 2214766A | 9/1989 | United Kingdom . |

OTHER PUBLICATIONS

United States Statutory Invention Registration—Reg. No. H1506 Dated: Dec. 5, 1995—Graphical User Interface for Editing a Palette of Colors.

*Primary Examiner*—Phu K. Nguyen
*Assistant Examiner*—Cliff N. Vo
*Attorney, Agent, or Firm*—Joan Pennington

[57] ABSTRACT

A method and apparatus are provided for creating a color name dictionary. A predetermined color space is identified. The predetermined color space is divided into a plurality of color space segments. A color name is assigned to each of the plurality of color space segments. A method and apparatus are provided for querying an image by color name. An image is acquired from an image source, such as an image database. A pixel is acquired from the acquired image. The acquired pixel is compared with a color name volume. A color name volume containing the acquired pixel is identified.

28 Claims, 17 Drawing Sheets

IMAGE REGION DICTIONARY 202

| X-L | Y-L | X-H | Y-H | REGION NAME |
|---|---|---|---|---|
| 0.0 | 0.0 | 1.0 | 1.0 | FULL |
| 0.0 | 0.0 | 0.5 | 1.0 | LEFT |
| 0.0 | 0.0 | 1.0 | 0.5 | BOTTOM |
| 0.0 | 0.0 | 0.5 | 0.5 | BOTTOM LEFT |
| 0.25 | 0.25 | 0.75 | 0.75 | CENTER |
| * | | | | |
| * | | | | |

COLOR NAME HISTOGRAM 214

| IMAGE | REGION | COLOR NAME | COUNT | FRACTIONAL COUNT |
|---|---|---|---|---|
| 1 | CENTER | ALL | 307200 | 1.00 |
| 1 | CENTER | BLACK | 30720 | .10 |
| 1 | CENTER | GRAY | 39936 | .13 |
| 1 | CENTER | WHITE | 86016 | .28 |
| 1 | CENTER | RED | 89088 | .29 |
| 1 | CENTER | BLUE | 15360 | .05 |
| 1 | CENTER | GREEN | 12288 | .04 |
| 1 | CENTER | YELLOW | 33792 | .11 |
| 2 | CENTER | ALL | 307200 | 1.00 |
| 2 | CENTER | BLACK | 24576 | .08 |
| 2 | CENTER | GRAY | 36864 | .12 |
| 2 | CENTER | WHITE | 58368 | .19 |
| 2 | CENTER | RED | 76800 | .25 |
| * | * | * | | |
| * | | | | |

FIG.4

COLOR NAME DICTIONARY 210

| L-L | L-H | CHR-L | CHR-H | HUE-L | HUE-H | LEVEL | COLOR NAME |
|---|---|---|---|---|---|---|---|
| 0.8 | 1.0 | 0.0 | 0.3 | 0.0 | 360.0 | 1 | WHITE |
| 0.0 | 1.0 | 0.3 | 1.0 | -45.0 | 45.0 | 1 | RED |
| 0.0 | 1.0 | 0.3 | 1.0 | 45.0 | 135.0 | 1 | YELLOW |
| 0.0 | 1.0 | 0.3 | 1.0 | 135.0 | 225.0 | 1 | GREEN |
| 0.0 | 1.0 | 0.3 | 1.0 | 225.0 | 315.0 | 1 | BLUE |
| 0.0 | 0.2 | 0.0 | 0.3 | 0.0 | 360.0 | 1 | BLACK |
| 0.2 | 0.8 | 0.0 | 0.3 | 0.0 | 360.0 | 1 | GRAY |
| * | * | * | * | * | * | | |
| 0.0 | 0.3 | 0.3 | 0.6 | 260.0 | 280.0 | 2 | DARK BLUE |
| 0.0 | 0.3 | 0.6 | 1.0 | 260.0 | 280.0 | 2 | DARK SATURATED BLUE |
| 0.0 | 0.3 | 0.3 | 0.6 | 240.0 | 260.0 | 2 | DARK GRAYISH BLUE |
| 0.0 | 0.3 | 0.1 | 0.3 | 260.0 | 280.0 | 2 | MEDIUM BLUE |
| 0.3 | 0.7 | 0.3 | 0.6 | 260.0 | 280.0 | 2 | |
| * | * | * | * | * | * | | |
| 0.2 | 0.3 | 0.7 | 0.8 | 250.0 | 255.0 | 3 | DARK VIVID PEACOCK BLUE |
| * | | | | | | | |

FIG.5

METHOD AND APPARATUS FOR CREATING A COLOR NAME DICTIONARY AND FOR QUERYING AN IMAGE BY COLOR NAME

FIELD OF THE INVENTION

The present invention relates to the data processing field, and more particularly, relates to method and apparatus for implementing computer color space with associated color names.

DESCRIPTION OF THE PRIOR ART

There exist a number of international standards for color measurement. The most prominent international standards for color measurement are collectively termed the Commission Internationale D 1'Eclairage, or International Commission on Illumination (CIE system). The CIE system is based on the premise that specific perceived colors result from the proper combination of an illuminant or reference light source, an object, and an observer. A useful explanation of the CIE system is provided in "Principles of Color Technology," Section 2B and 2C, Edition 1981, by Billmeyer and Saltzman. U.S. Pat. No. 4,985,853, issued Jan. 15, 1991, provides a description of the CIE system, and other information relevant to three-dimensional color specification systems. It is presumed that these techniques are known to those having skill in this art.

U.S. Pat. No. 5,502,458, issued Mar. 26, 1996 to Gordon W. Braudaway and Helen R. Delp, discloses a process which defines a display-independent standard normalized palette table with reference to a standard display. The disclosed process steps are to first determine a matrix of transformation that will transform desired pixel colors, represented as CIE XYZ tristimulus values, into RGB tristimulus values that are referenced to the standard display, to determine a suitable color palette, to measure the XYZ* values of each palette entry on the standard display, to compute the RGB* tristimulus values that correspond to the measured XYZ* values for the palette entries, and to build a display-independent normalized palette table containing these RGB* tristimulus values of the palette entries. Next, each pixel of the desired image is replaced by the palette entry index of the closest matching color in the display-independent normalized palette table, and any resulting color mismatches are apportioned to adjacent pixels using standard halftoning techniques. The resulting image is the display-independent palettized image that faithfully represents the desired image.

There is no easy way to refer to a computer color by its popular name. Known applications allow users to pick colors by displaying a huge selection of them, or by letting users adjust the red, green, and blue (RGB) primary color combination or HUE, lightness and brightness of a patch until the desired color is achieved, which is a manual process. Some systems provide names for all the entries in a palette of colors, but there is no consistent way to relate a color called peach to orange. There is also no easy way to name a resultant computer color. If you were to search a computer image database for images with something red in the upper right corner of at least a certain size, the user would need to define what was meant by red in some manual way.

Also a visual selection may not always be reliable. What appears red today to one person in a given visual environment and psychological setting may be different to a different person tomorrow. The process of manual selection of colors is affected by many things including the brightness and colors of the objects around the person making a selection; what the person looked at previously, for example, if the person just came in from outside; what type of device is being used to display the color; and whether or not the person has normal color vision.

In a computer system, if a user searches an image database for images with a specific color and the user is able to accurately remember and specify the color he observed, typically the user would not get a good match due to the color perception differences in the context of the object and the CRT display. An experienced user, like a retail buyer or a car salesman or a makeup artist may be able to choose colors accurately using a CRT display, while a casual user may not be able to choose colors accurately.

A need exists for an effective means for implementing computer color space with associated color names in a computer system.

SUMMARY OF THE INVENTION

Important objects of the present invention are to provide method and apparatus for implementing computer color space with associated color names; to provide method and apparatus for creating a color name dictionary; to provide method and apparatus for querying an image by color name; and to provide such methods and apparatus that overcome some disadvantages of prior art arrangements.

In brief, a method and apparatus are provided for creating a color name dictionary. A predetermined color space is identified. The predetermined color space is divided into a plurality of color space segments. A color name is assigned to each of the plurality of color space segments.

A method and apparatus are provided for querying an image by color name. An image is acquired from an image source, such as an image database. A pixel is acquired from the acquired image. The acquired pixel is compared with a color name volume. A color name volume containing the acquired pixel is identified.

BRIEF DESCRIPTION OF THE DRAWING

The present invention together with the above and other objects and advantages may best be understood from the following detailed description of the preferred embodiments of the invention illustrated in the drawings, wherein:

FIG. 4 is a diagram illustrating an exemplary color name histogram of the preferred embodiment;

FIG. 5 is a diagram illustrating an exemplary color name dictionary of the preferred embodiment;

DETAILED DESCRIPTION OF THE PREFERRED EMBODIMENTS

Figure 1:
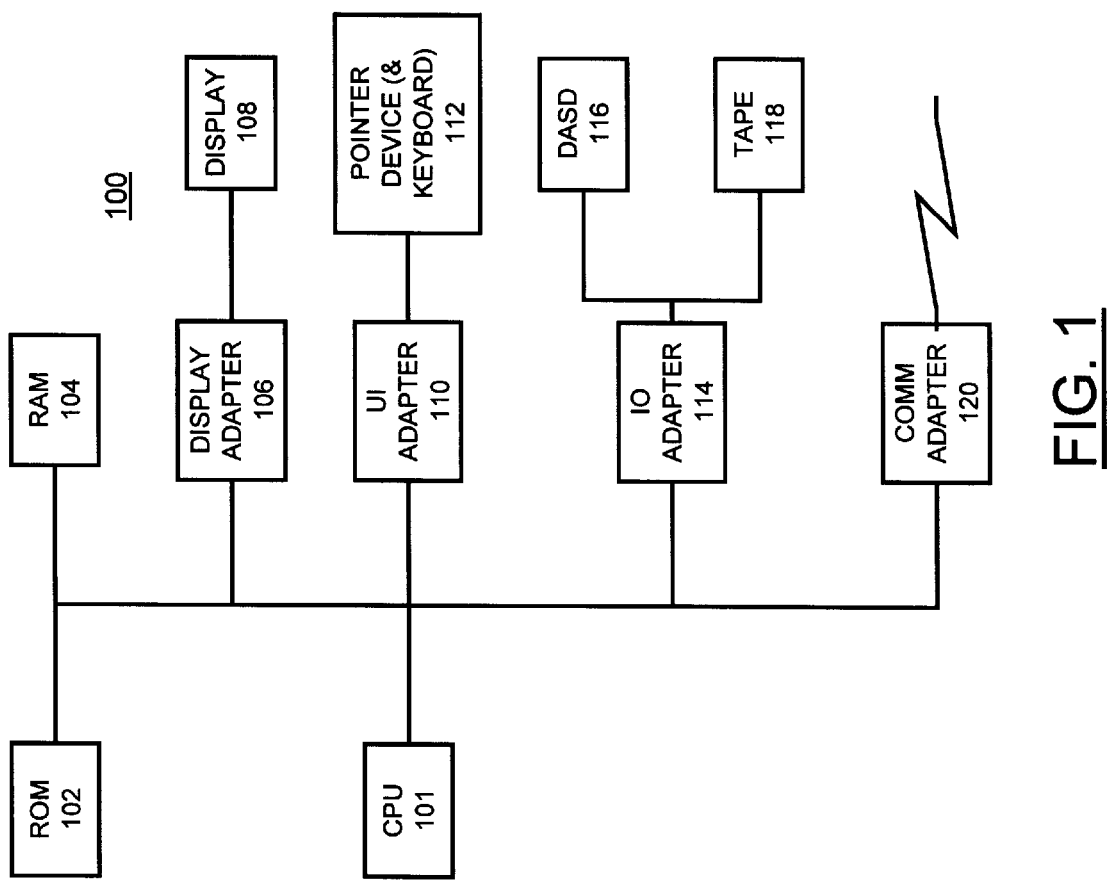
FIG. 1 is a block diagram representation of a computer or data processing system of the preferred embodiment.

Having reference now to the drawings, in FIG. 1 there is shown a computer or data processing system of the preferred embodiment generally designated by the reference character 100. As shown in FIG. 1, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

Various commercially available processors could be used for computer system 100, for example, an IBM personal computer or similar workstation can be used. Central processor unit 101 is suitably programmed to execute the logic flow of FIG. 2 and the flowcharts of FIGS. 6A, 6B, 6C, 7, 8A, 8B, 9, 10, 11A, 11B, 12A, and 12B, and to generate an image region dictionary 202, a color name histogram 214, and a color name dictionary 210 as illustrated respectively in FIGS. 3, 4, and 5 of the preferred embodiment.

In accordance with features of the preferred embodiment, color name volumes are defined in a perceptually or visually uniform color space and each volume includes an associated color name. An exemplary color name dictionary 210 of the preferred embodiment is illustrated in FIG. 5. Exemplary steps according to the teachings of the invention for creating the color name dictionary 210 are shown in FIGS. 8A and 8B. Exemplary steps according to the teachings of the invention for querying an image by color name are shown in FIGS. 6A, 6B, 6C, 7, 9, 10, 11A, 11B, 12A and 12B.

Figure 2:
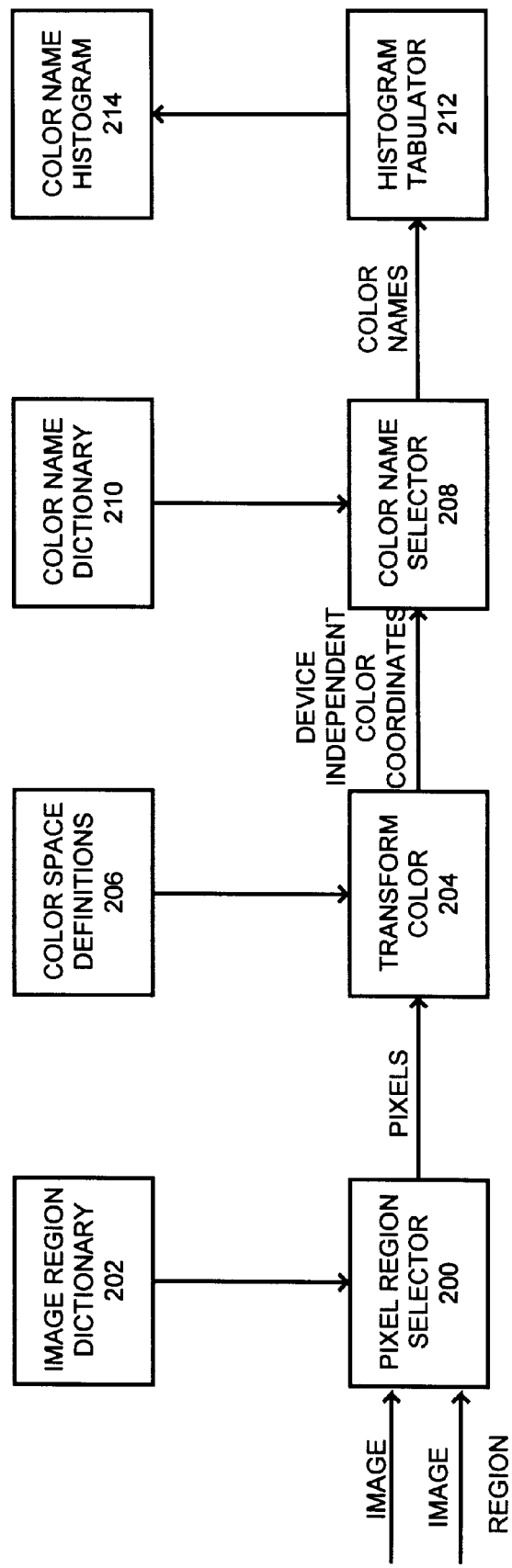
FIG. 2 is a logic flow diagram illustrating the method and apparatus of the preferred embodiment.

Referring to FIG. 2, there is shown a logic flow diagram illustrating a preferred embodiment of the present invention. A pixel region selector 200 receives an image and image region inputs at lines IMAGE and IMAGE REGION. An image can be acquired from an image database, for example stored on DASD 116 or from another computer system via the communications adapter 120. An image region name is entered by a user, such as full or center to process the entire image or a center image region.

Figures 3, 13:
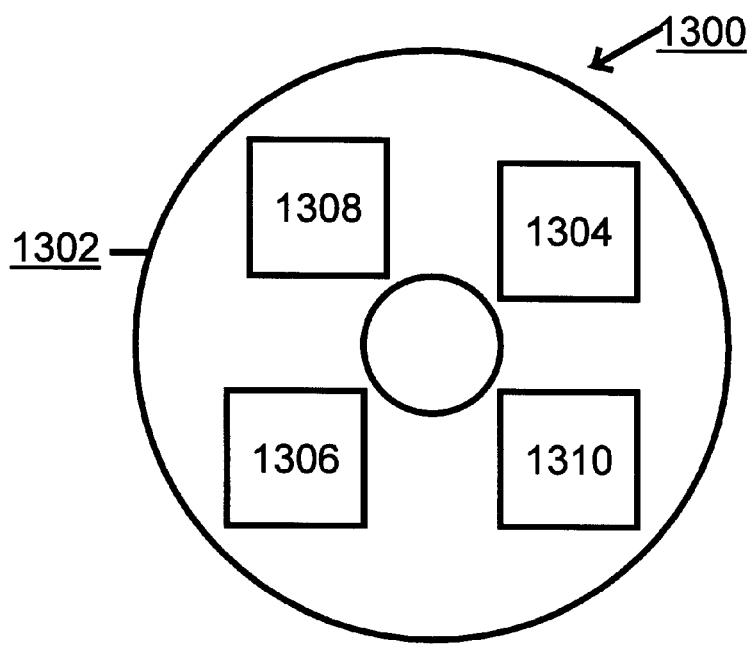
FIG. 3 is a diagram illustrating an exemplary image region dictionary of the preferred embodiment.
FIG. 13 is a block diagram illustrating a computer program product in accordance with the preferred embodiment.

Referring also to FIG. 3, an exemplary image region dictionary 202 is illustrated in FIG. 3. The image region dictionary 202 is operatively coupled to the pixel region selector 200. The image region dictionary 202 define; names for regions of an image, such as, full, left, bottom, bottom left quadrant, center, and the like. The pixel region selector 200 selects pixels from an image that are within a particular image region and provides a pixel output at line PIXELS to a transform color block 204. The transform color block 204 operatively coupled to a color space definitions block 206 receives and transforms the pixel coordinates from the color space of the image or a device-dependent color space into a device-independent color space or pixel color space coordinates of a color name dictionary 210. For example, the pixels are transformed from a device specific color space, like CMYK or RGB to the visually uniform space of the color name dictionary 210. The color space definitions block 206 specifies the linear and nonlinear transformations required by the transform color block 204. The color name dictionary 210, such as illustrated in FIG. 5 defines boundaries for 3-dimensional volumes in a device independent, perceptually uniform color space and defines color names for all color name volumes.

In accordance with the invention, a color name selector 208 receives device independent color coordinates or an approximation thereof, and returns a color name (or hierarchy of names). The color name selector 208 operatively coupled to the color name dictionary 210, receives the pixel color space coordinates of the color name dictionary 210 and determines which color name volumes contain each device-independent pixel.

Referring also to FIG. 4, a histogram tabulator 212 counts occurrences of the pixels and of each of the identified color name volumes and computes fractional counts for each identified color name volume in an image region. A color name histogram 214, such as illustrated in FIG. 4 is generated by the histogram tabulator 212 and provides the percentage occurrence of each of the color names within the selected image region of the particular image or multiple images.

As illustrated in FIG. 5, the color name dictionary 210 provides a table of the boundary definitions of each color name. In accordance with the invention, the color name dictionary 210 defines a set of color name boundaries, preferably in a three-dimensional, visually uniform color space to generally agree with human vision, such as CIE L*a*b* or CIE L*u*v*. In a preferred implementation, the boundaries of each color name region are defined as concentric cylindrical segments. Each three-dimensional color name volume or region defines lightness, hue, and chroma for a particular color name. The three-dimensional coordinates for the concentric cylindrical color name segments include for example, a lower and upper radius defining chroma, a lower and upper angle in the x-y plane defining hue, and a lower and upper Z coordinate defining lightness. Each three-dimensional color name region is defined by 6 limits including lightness low, (L-L) lightness high (L-H), chroma low (CHR-L), chroma high (CHR-H), hue low (HUE-L) and hue high (HUE-H).

It should be understood that the present invention is not limited to the color name volumes defined by concentric cylindrical segments. Volumes can be specified in Cartesian, spherical, cylindrical or curvilinear coordinates. Spherical volume segments would work well. Volumes can be approximated by segmenting, by defining a volume as a combination of multiple volumes, or by curve fitting. More complicated surface definitions could be used to define the volumes, or more complicated volumes could be approximated as a sum of multiple simple cylinder segments.

It should be understood that the present invention enables multiple color name dictionaries 210 to be defined, such as, with a different color name dictionary 210 specific for a different industry. A query mechanism is facilitated to select one of the multiple color name dictionaries 210 according to the context of the customer.

Figure 6A:
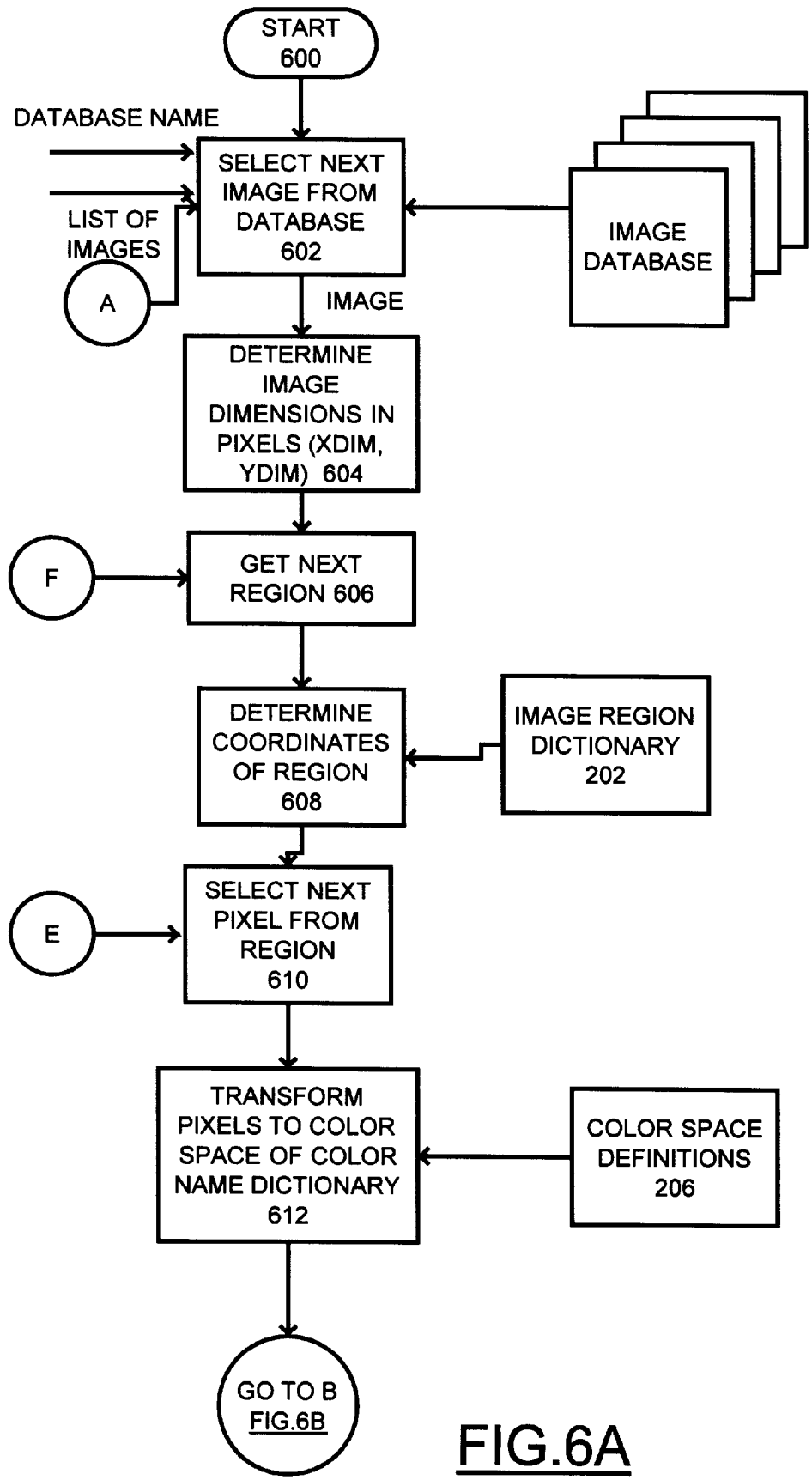
FIGS. 6A, 6B, and 6C are flowcharts illustrating exemplary sequential steps for querying an image by color name.
Figure 6B:
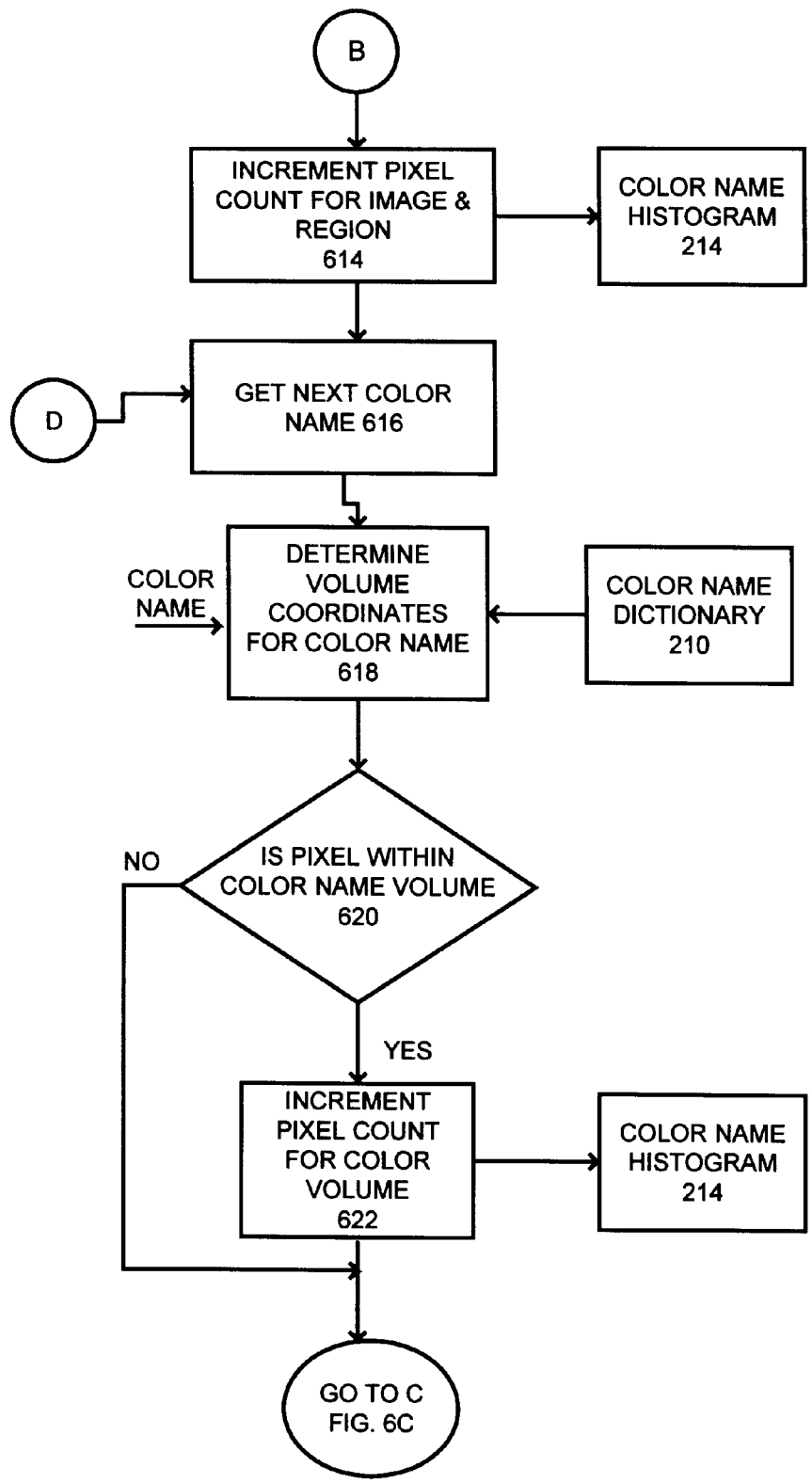
Figure 6C:
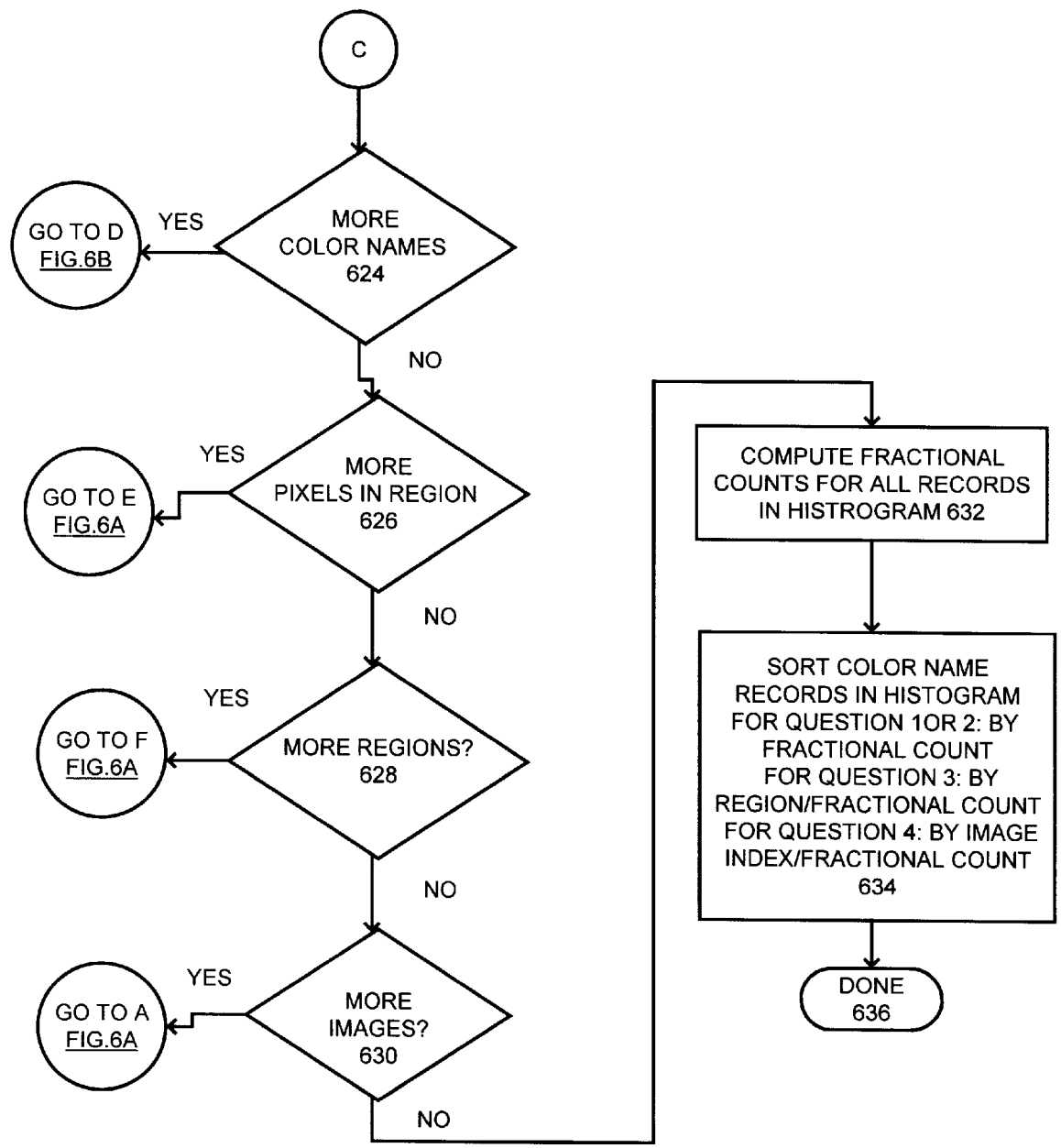

Referring now to FIGS. 6A, 6B, 6C, exemplary sequential steps for querying an image by color name begin as indicated at a block 600. The process for querying an image database by color name of the invention can be performed without requiring that the computer system 100 have a color monitor and when the user is color blind. An image is selected from an image database as indicated at a block 602. Image dimensions in pixels (XDIM, YDIM) are determined as indicated at a block 604. A next image region is obtained as indicated at a block 606. Using the image region dictionary 202, the coordinates of the image region are determined as indicated at a block 608. A next pixel from the image region is obtained as indicated at a block 610. For each pixel, the pixel is contained within the image region IF:

$$X\text{-}L<=(px/xdim)<X\text{-}H \text{ AND } Y\text{-}L<=(py/ydim)<Y\text{-}H,$$

where px and py are the number of pixels to the left and below the pixel in the image. Next using the color space definitions 206, the selected pixel is transformed to color space of color name dictionary 210 as indicated at a block 612. The color transformation step at block 612 is not required in a case where the pixel is already in the color space of the color name dictionary or an approximation thereof. It should be understood that the boundary values and direction are arbitrary, only a consistent boundary definition is required.

Referring to FIG. 6B, following entry point B, the pixel count for the image and the image region are incremented and provided to generate the color name histogram 214 as indicated at a block 614. A next color name is obtained as indicated at a block 616. Then using the color name dictionary 210, the volume coordinates; for the color name are determined as indicated eat a block 618. It is determined whether the selected pixel is within color name volume as indicated at a decision block 620. In determining if the pixel is within the region, the pixel position can be converted to a fraction or the region dimension can be converted to pixel coordinates. In determining if a pixel is within a color volume or within an image region, for best accuracy, care should be taken to include the boundaries in only one of the volumes or areas. There are many ways to do this which are equivalent. When determined that the pixel is within color name volume at block 620, then the pixel count for the color name is incremented and provided to generate the color name histogram 214 as indicated at a block 622.

Referring to FIG. 6C, following entry point C, it is determined whether there are more color names as indicated at a decision block 624, which requires a repeat of the sequence 616–624 returning to entry point D in FIG. 6B. Next it is determined whether there are more pixels in region as indicated at a decision block 626, which requires a repeat of the sequence 610–626 returning to entry point E in FIG. 6A. Then it is determined whether there are more regions as indicated at a decision block 628, which requires a repeat of the sequence 606–628 returning to entry point F in FIG. 6A. Next it is determined whether there are more images as indicated at a decision block 630, which requires a repeat of the sequence 602–630 returning to entry point A in FIG. 6A. When all images have been processed, fractional counts are computed for all records in the color name histogram as indicated at a block 632.

Then as indicated at a block 634 the color name records in histogram are sorted, for question 1 or 2: by fractional count; for question 3: by region/fractional count and for question 4: by image index/fractional count. At block 634, question 1 can represent a query to identify images in the image database have the most of a particular color name in a selected particular image region. For example, question 1 may be which images in the database have the most of color name red in the top right image region. At block 634, question 2 can represent a query to identify how much of a particular color name, such as red, in a selected particular image region, such as the top right image region, the images in the database have. At block 634, question 3 represents a query to identify the most frequently occurring color names in each region of a particular image, such as image number 1. At block 634, question 4 represents a query to identify the most frequently occurring color names in each image. The answer to the particular question is provided at block 634 to complete the database query as indicated at a block 636.

Figure 7:
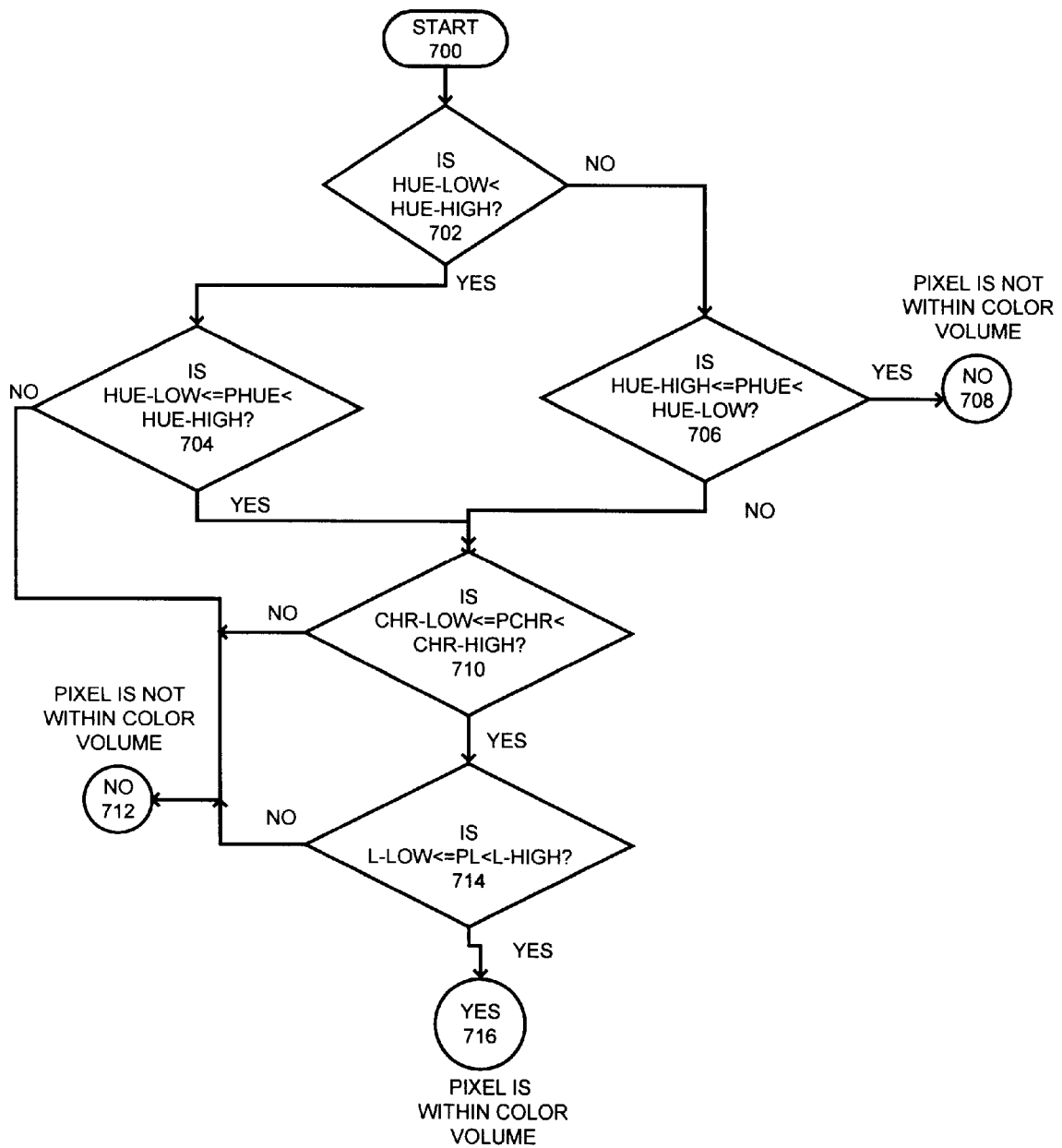
FIG. 7 is a flowchart illustrating exemplary sequential steps for identifying a pixel within a color name volumes.
Figure 8A:
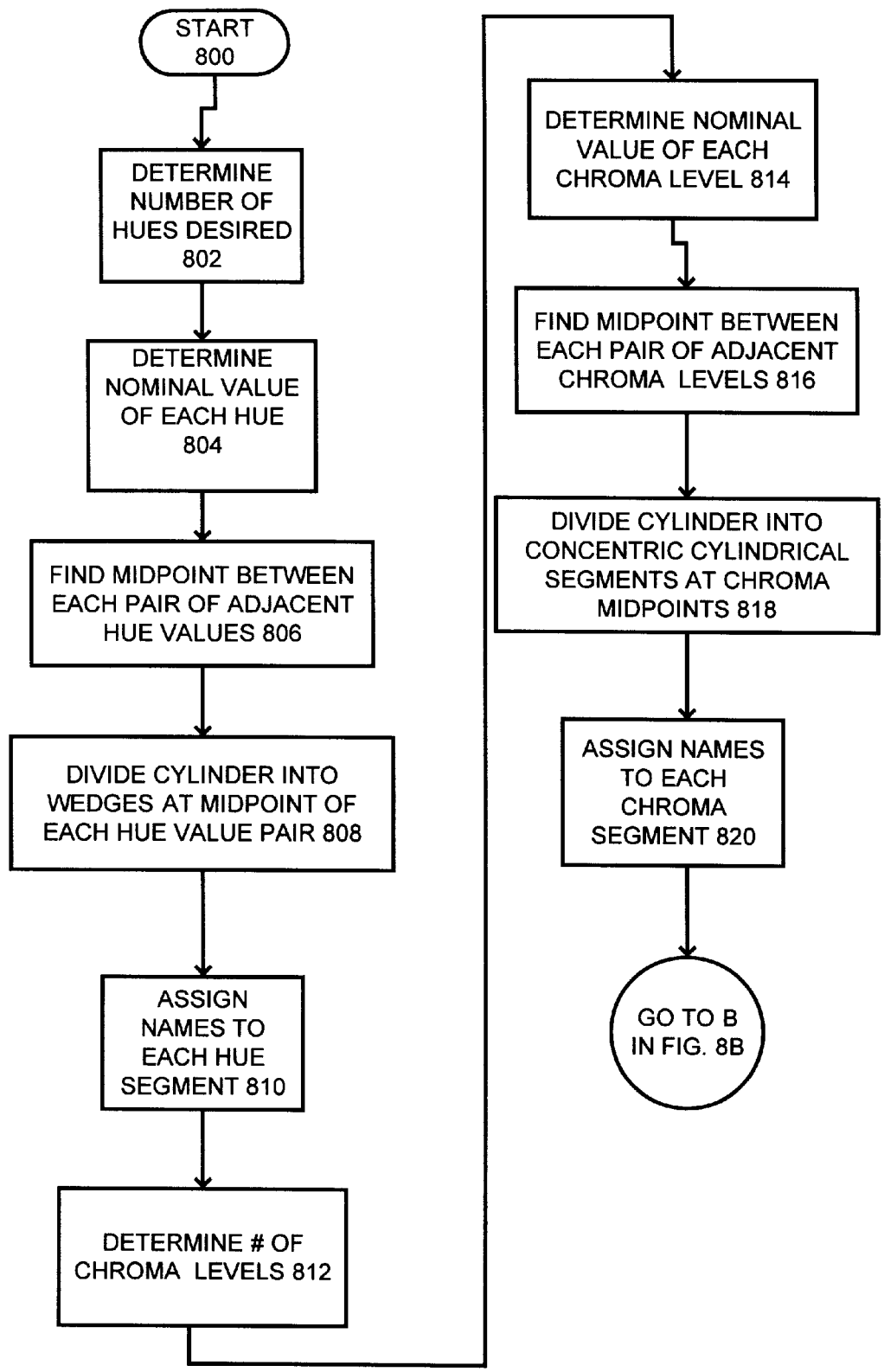
FIGS. 8A, and 8B are flowcharts illustrating exemplary sequential steps for creating a color name dictionary.
Figure 8B:
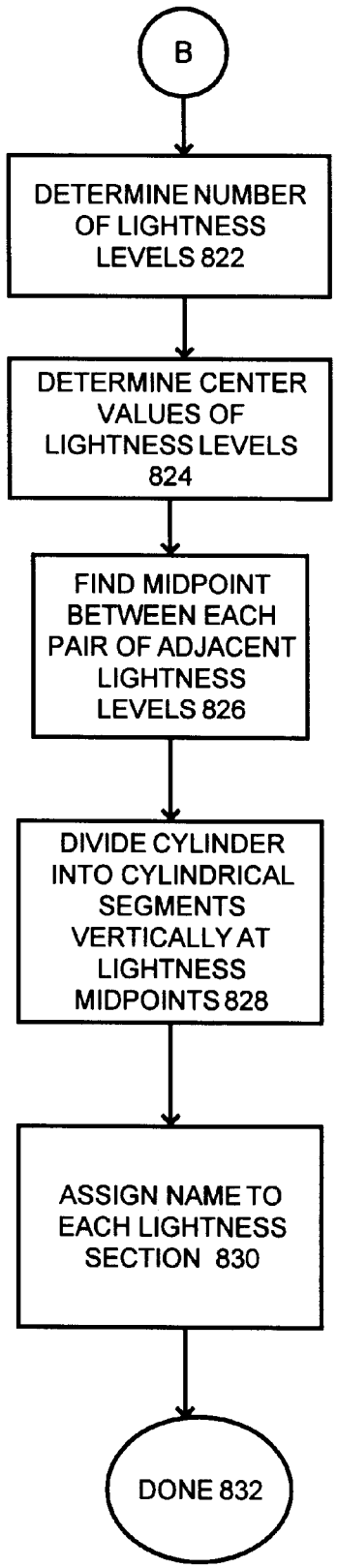

Referring to FIG. 7, exemplary sequential steps of block 620 in FIG. 6B to determine whether the pixel is within color volume are shown starting at a block 700. First it is determined whether HUE-LOW is less than HUE-HIGH as indicated at a decision block 702. Since hue is an angular measurement, HUE-LOW is not always less than HUE-HIGH. The terms HUE-LOW and HUE-HIGH are defined such that if you sweep from HUE-LOW to HUE-HIGH in the defined direction of increasing hue, this defines the desired interval. HUE-LOW is less than HUE-HIGH except when the volume includes the 360° through 0° boundary. If HUE-LOW is less than HUE-HIGH, then it is determined whether PHUE is greater than or equal to HUE-LOW and is less than HUE-HIGH as indicated at a decision block 704. If HUE-LOW is not less than HUE-HIGH, then it is determined whether PHUE is greater than or equal to HUE-HIGH and is less than HUE-LOW as indicated at a decision block 706. If determined that the pixel outside the hue boundaries at decision block 706, then a no is returned as indicated at a block 708 indicating that the pixel is not within the color volume. Otherwise, if determined that the pixel is within the hue boundaries at decision block 706 or at decision block 704, then it is determined whether PCHR is greater than or equal to CHR-LOW and is less than CHR-HIGH as indicated at a decision block 710. If the pixel is outside the chroma boundaries at decision block 710, then a no is returned as indicated at a block 712 indicating that the pixel is not within the color volume. If the pixel is within the chroma boundaries, it is determined whether PL is greater than or equal to L-LOW and is less than L-HIGH as indicated at a block 714. If yes, then a yes is returned as indicated at a block 716 indicating that the pixel is within the color volume. Otherwise if the pixel is outside the lightness boundaries, then a no is returned as indicated at a block 712 indicating that the pixel is not within the color volume.

Referring now to FIGS. 8A and 8B, exemplary sequential steps for creating a color name dictionary 210 are shown starting at block 800. Step 1 as indicated at a block 802 refers to selecting a desired number of hues for the color name dictionary 210. In step 2 as indicated at a block 804, a nominal value of each hue is identified. In step 3 as indicated at a block 806 a midpoint between adjacent hues is obtained. In step 4 its indicated at a block 808, the cylinder is divided into wedges at a midpoint of each hue value pair. In step 5 as indicated at a block 810, a color name is assigned to each hue segment. In step 6 as indicated at a block 812, a desired number of chroma levels is determined. In step 7 as indicated at a block 814, a nominal chroma value is determined. In step 8 as indicated at a block 816, the midpoint is found between each pair of adjacent chroma values. In step 9 as indicated at a block 818, the color cylinder is divided into concentric cylinders by the chroma midpoints. In step 10 as indicated at a block 820, a name is assigned to each concentric chroma segment.

Referring now to FIG. 8B, in step 11 as indicated at a block 822 following entry point B, a number of desired lightness levels is identified. In step 12 as indicated at a block 824, nominal center lightness values are determined. In step 13 as indicated at a block 826, a midpoint between each pair of adjacent lightness levels is found. In step 14 as indicated at a block 828, the color cylinder is divided into cylindrical segments vertically at lightness midpoints. In step 15 as indicated at a block 830, a color name is assigned to each lightness section, which completes the color name dictionary as indicated at a block 832.

It should be understood that the lightness, hue, and chroma dimensions can be subdivided in any order. For example, although hue was subdivided first in steps 1–5 at blocks 802–810, either of the other two dimensions; could have been processed first. Any of the dimensions can be subdivided differently for the different values of the other dimensions. For example, the lightness divisions can be the same for all hue and chroma blocks, or the lightness divisions can be different for any of the hue and chroma blocks. In addition, any of the hue and chroma blocks could have been divided into more or fewer than three lightness blocks. The same goes for any of the other divisions. In other words, steps 11–15 could have been inside a loop which varied hue, chroma or both. This is true for any or all three dimensions.

The steps 3, 8, 13 at block 806, 816 and 826 of finding the midpoint between each nominal value to subdivide each dimension can be provided by any of a number of curve fitting and other techniques to find a point between the respective nominal values. Also the steps of subdividing a dimension by finding nominal values and finding points between them could have been done in one step, where the boundary point was defined instead. Color names can be assigned to the individual hue, chroma, and lightness segments, or to the final volumes formed from combined hue, chroma, and lightness segments, such as illustrated in the color name dictionary 210 in FIG. 5. Also, it should be understood that more than one volume can be associated with the same color name. Also some of the hue, chroma, and lightness segments or subvolumes may not contain any visible colors.

It should be understood that the type of coordinate system is not limited, as long as it contains at least three dimensions and approximates a perceptually uniform color space. Cylindrical coordinate systems with the radius or chroma dimension, for example, going out from the origin or from the center of the lightness axis but not constrained to be perpendicular to the L axis can be used. Spherical coordinate systems and curvilinear coordinate systems can be used.

Figure 9:
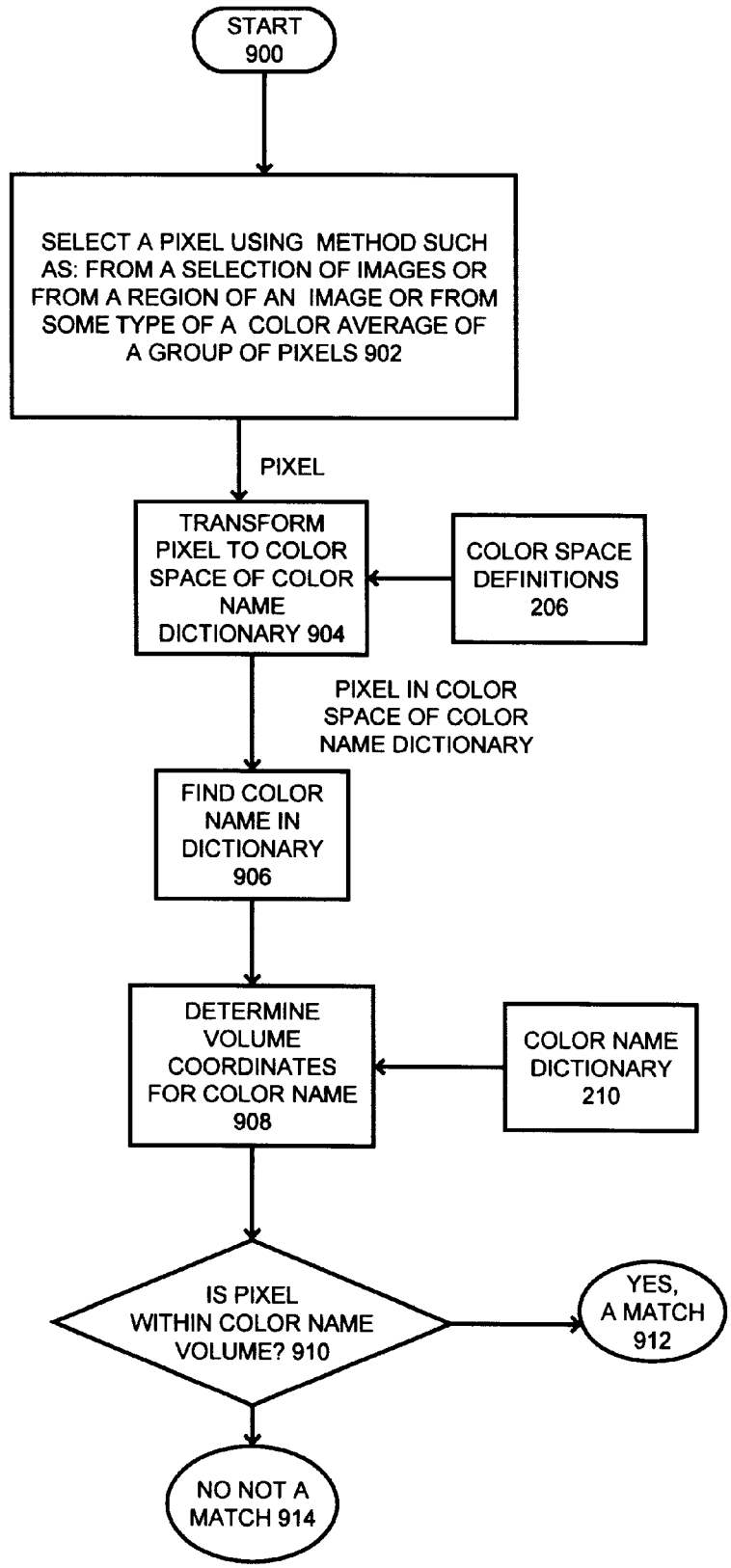
FIG. 9 is a flowchart illustrating exemplary sequential steps for querying an image by color name to identify whether a pixel is a particular color.

FIG. 9 is a flowchart illustrating exemplary sequential steps for querying an image by color name to identify whether a pixel is a particular color starting at a block 900. First a pixel is selected using a method such as: from a selection of images or from a region of an image or from some type of a color average of a group of pixels as indicated at a block 902. The selected pixel is transformed to the color space of color name dictionary 210 as indicated at a block 904. Next the color name is found in the color name dictionary as indicated at a block 906. Volume coordinates for color name are determined utilizing the color name dictionary as indicated at a block 908. Then it is determined whether the selected pixel is within a particular color name volume as indicated at a decision block 910. If yes, a match is returned as indicated at a block 912. Otherwise, not a match is returned as indicated at a block 914.

Figure 10:
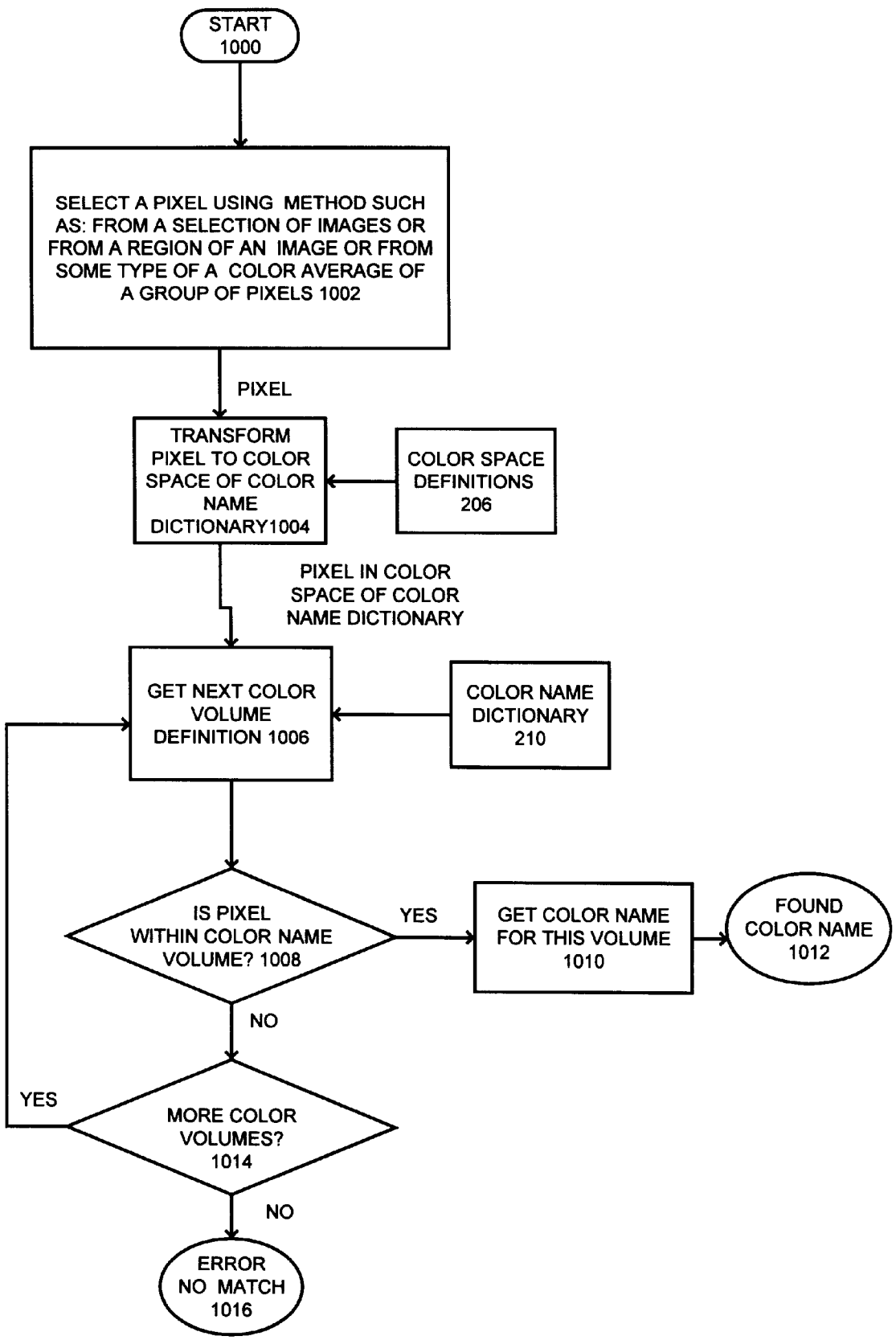
FIG. 10 is a flowchart illustrating exemplary sequential steps for querying an image by color name to identify a particular color of a pixel.

FIG. 10 is a flowchart illustrating exemplary sequential steps for querying an image by color name to identify a particular color of a pixel starting at a block 1000. A pixel or a point in color space is selected using method such as: from a selection of images or from a region of an image or from some type of a color average of a group of pixels as indicated at a block 1002. The pixel is transformed utilizing the color space definitions 206 to color space of color name dictionary 210 as indicated at a block 1004. A next color volume definition is obtained as indicated at a block 1006. It is determined whether the selected pixel is within the color name volume as indicated at a decision block 1008. If the selected pixel is within the color name volume, the color name for this volume is obtained as indicated at a block 1010. The found color name is returned as indicated at a block 1012. Otherwise, if the selected pixel is not within the color name volume, then it is determined whether more color volumes exist as indicated at a decision block 1014. If so, then the sequential steps return to block 1006. Otherwise if no more color volumes exist, then an error, no match is returned as indicated at a block 1016.

Figure 11A:
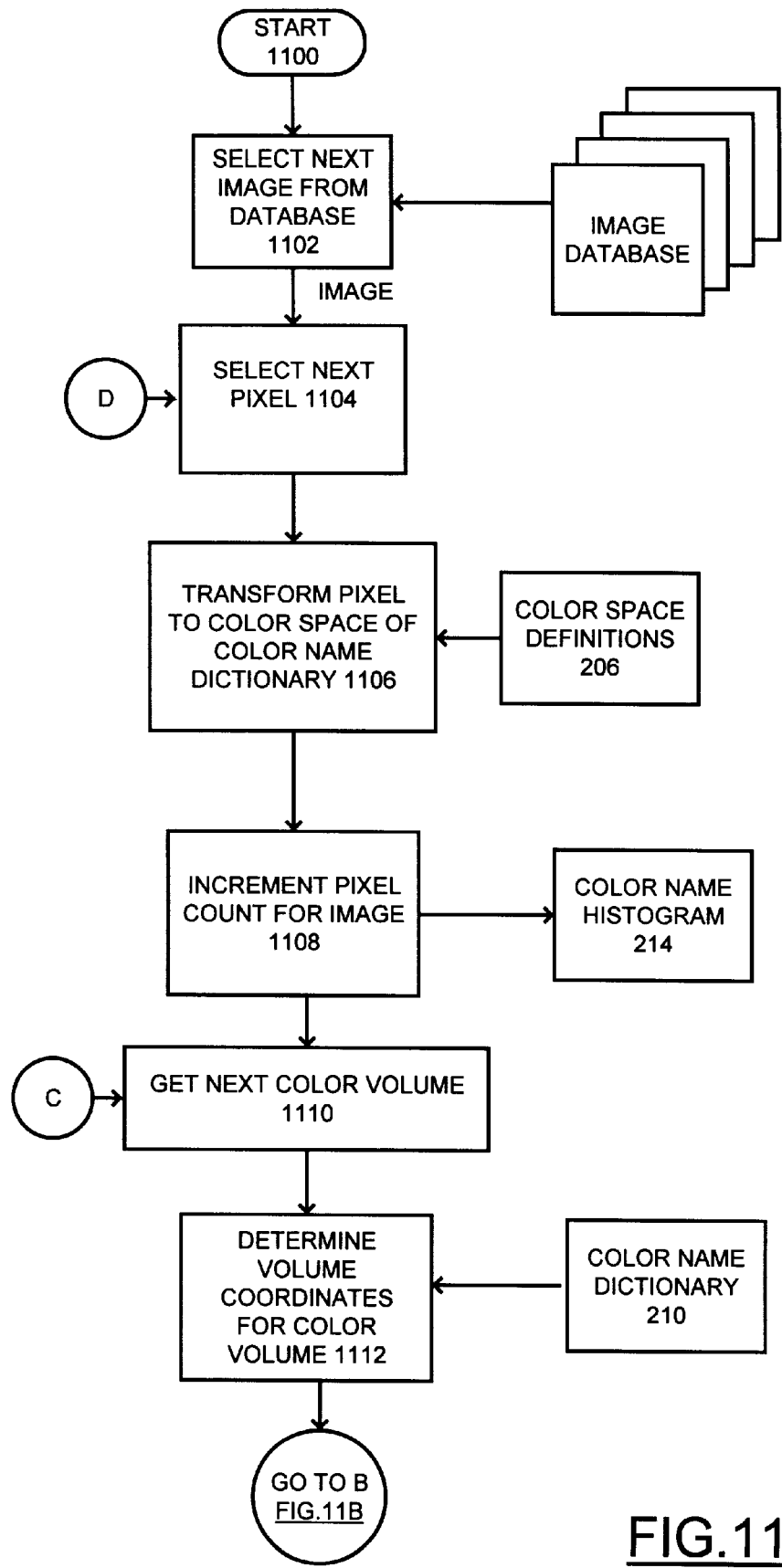
FIGS. 11A, and 11B are flowcharts illustrating exemplary sequential steps for querying an image by color name to identify the most frequent color in the image.
Figure 11B:
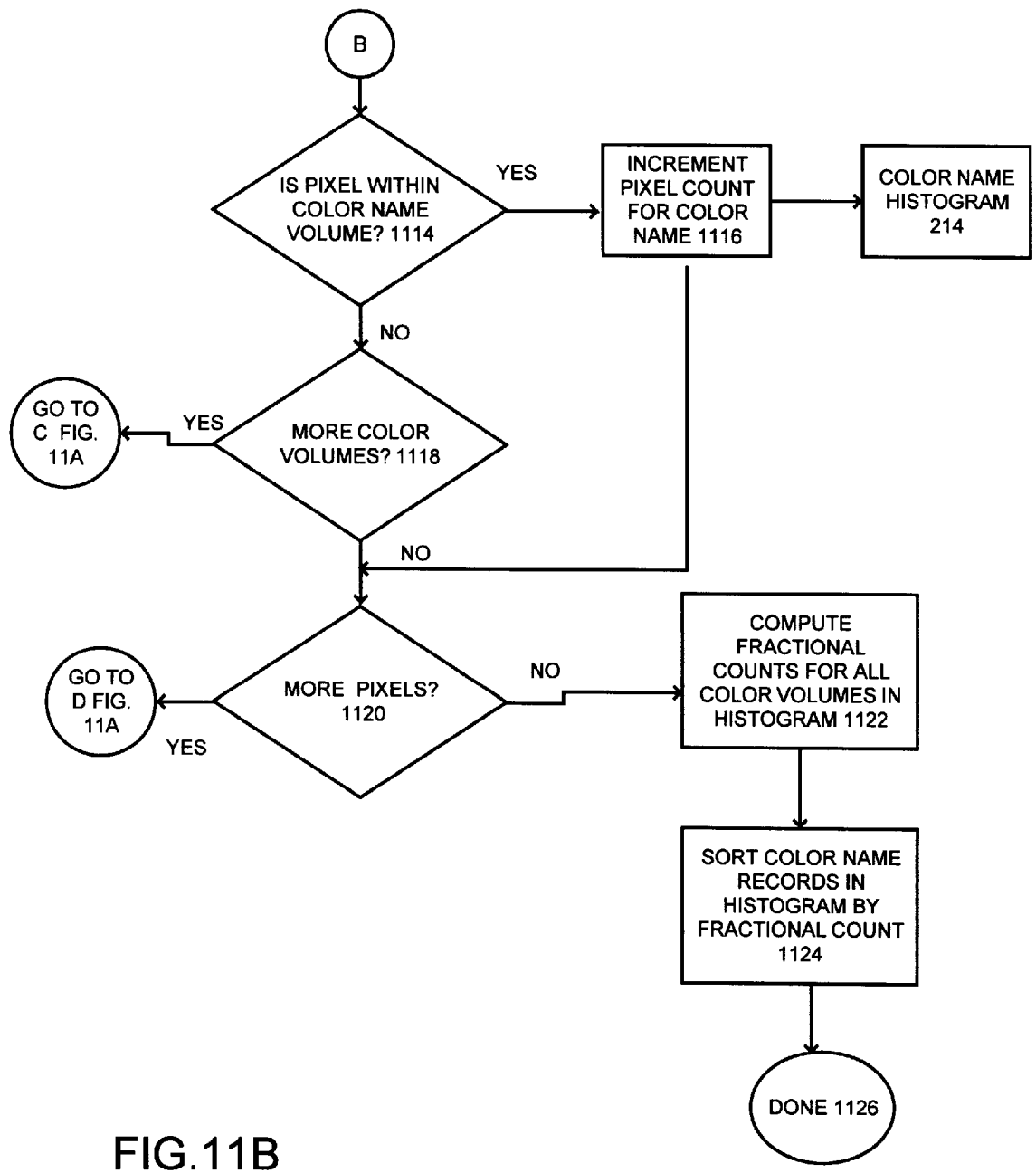

FIGS. 11A, and 11B illustrate exemplary sequential steps for querying an image by color name to identify the most frequent color in the image starting at a block 1100. A next image from the database is selected as indicated at a block 1102. The pixel is transformed to the color space of color name dictionary 210 utilizing the color space definitions as indicated at a block 1106. The pixel count for image is incremented to generate the color name histogram 214 as indicated at a block 1108. A next color volume is obtained as indicated at a block 1110. Volume coordinates for the color volume are determined utilizing the color name dictionary 210 as indicated at a block 1112.

Referring to FIG. 11B, it is determined whether the pixel is within color name volume as indicated at a decision block 1114. If so, the pixel count for color name is incremented to generate the color name histogram 214 as indicated at a block 1116. Otherwise it is determined whether more color volumes exist as indicated at a decision block 1118. If more color volumes exist, then the sequential steps return to C in FIG. 11A to continue with the next color volume. Otherwise, after the pixel count is incremented at block 1116 and if determined that no more color volumes exist at decision block 1118, then it is determined whether more pixels remain as indicated at a decision block 1120. If more pixels remain, then the sequential steps return to D in FIG. 11A to continue with the next pixel. When no more pixels remain, then fractional counts are computed for all color volumes in histogram 214 as indicated at a block 1122. The color name records in histogram are sorted by fractional count as indicated at a block 1124 to complete the query as indicated at a block 1126.

Figure 12A:
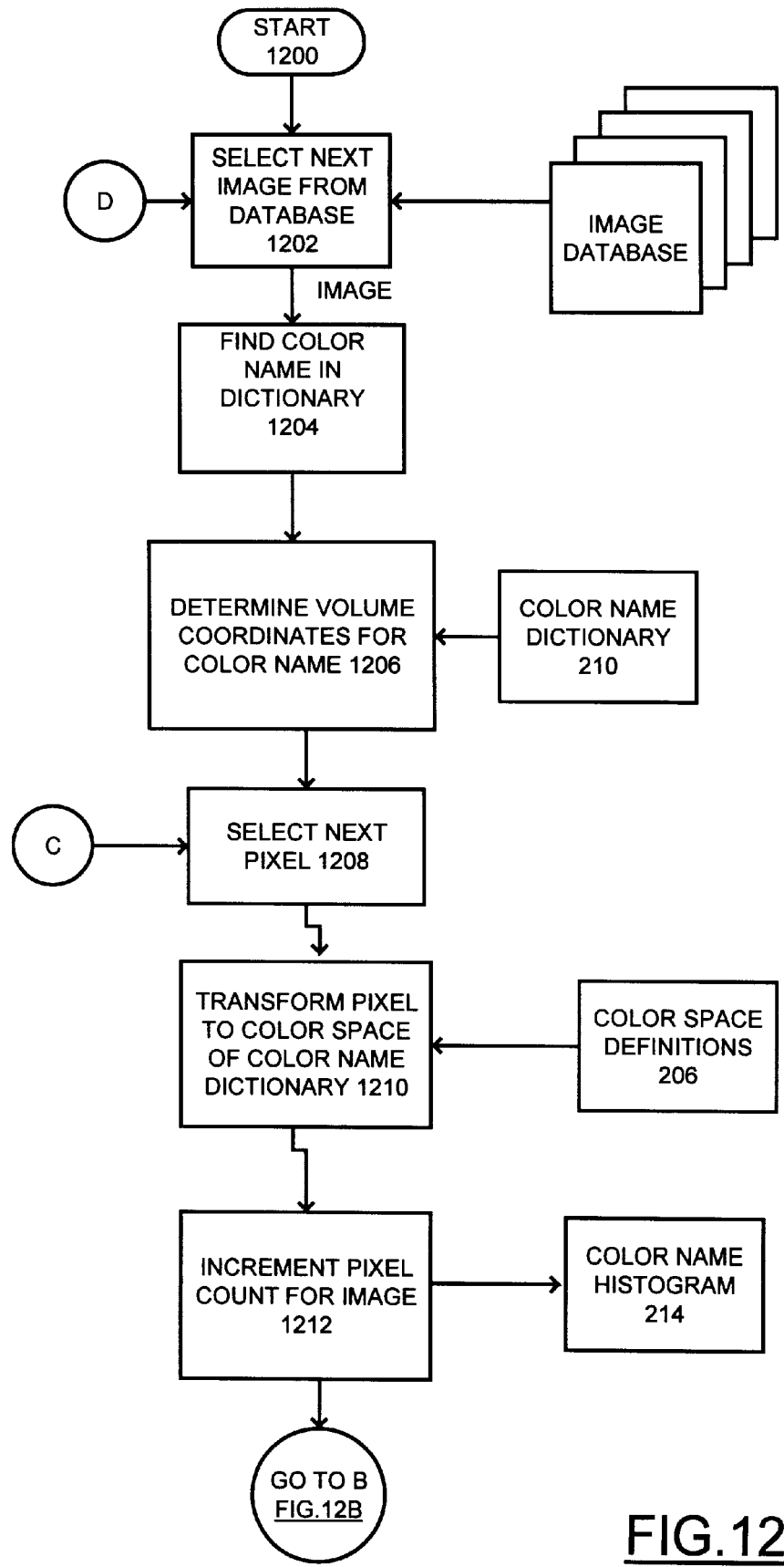
FIGS. 12A, and 12B are flowcharts illustrating exemplary sequential steps for querying an image database by color name to identify which images in the image database have the most of a particular color name.
Figure 12B:
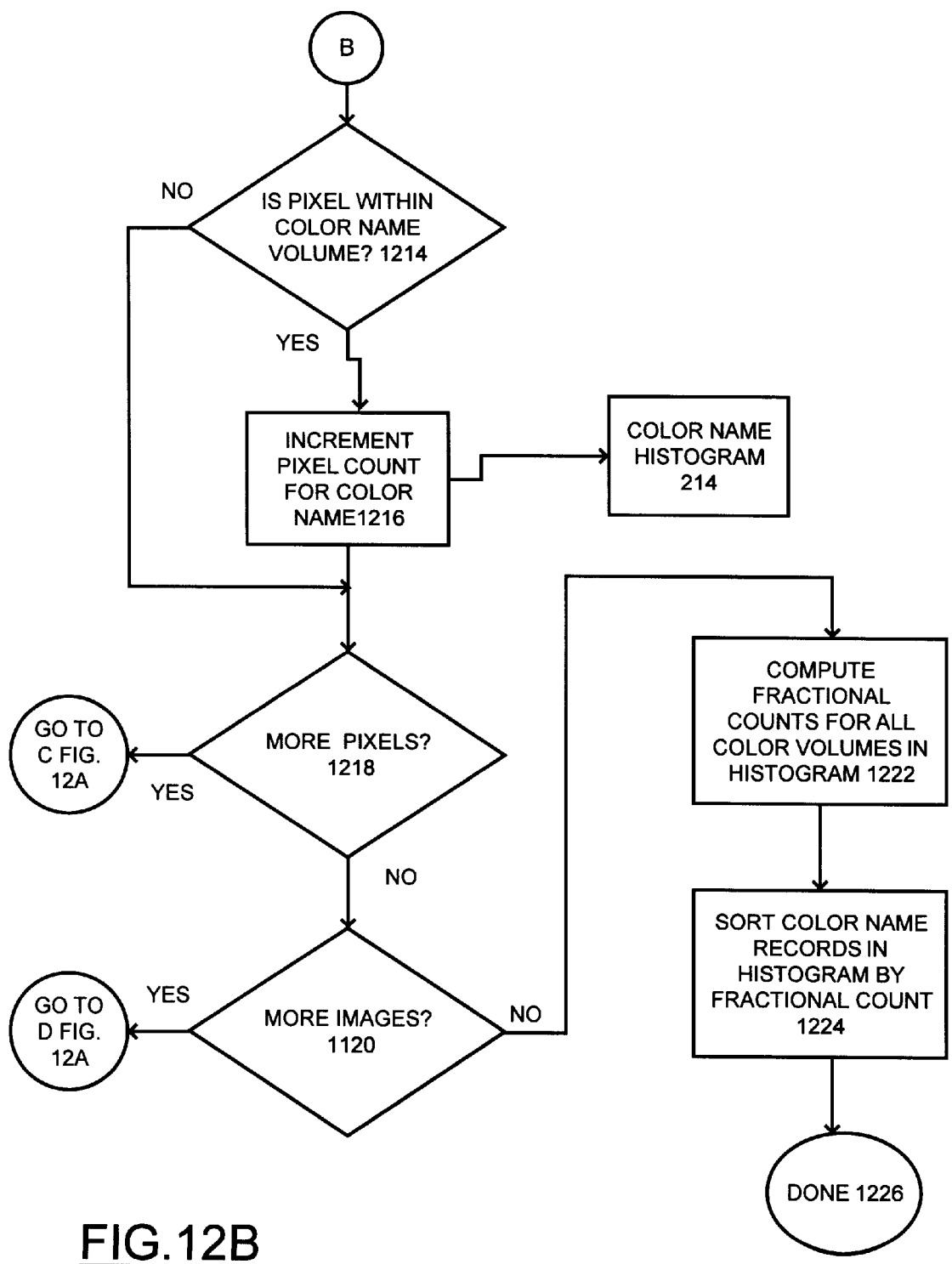

FIGS. 12A, and 12B are flowcharts illustrating exemplary sequential steps for querying an image database by color name to identify which images in the image database have the most of a particular color name, for example, to answer the question: "Which images in the database have the most of color name red?" A next image from database is selected as indicated at a block 1202. Then a color name is found in the color dictionary 210 as indicated at a block 1204. Volume coordinates; for the particular color name are determined utilizing the color dictionary 210 as indicated at a block 1206. A next pixel is selected as indicated at a block 1208. The pixel is transformed to the color space of color name dictionary 210 utilizing the color space definitions as indicated at a block 1210. Next the pixel count is increment for the image and the color name histogram 214 is updated as indicated at a block 1212.

Referring to FIG. 12B following entry point B, it is determined whether the pixel is within the color name volume as indicated at a decision block 1214. If yes, the pixel count for color name is incremented and the color name histogram 214 is updated as indicated at a block 1216. Otherwise, it is determined whether more pixels remain as indicated at a decision block 1218. If so, the sequential operations return following entry point C in FIG. 12A to obtain a next pixel. When no more pixels remain, it is determined whether more images remain as indicated at a decision block 1120. If so, the sequential operations return following entry point D in FIG. 12A to obtain a next image. When no more images remain, then fractional counts are computed for all records in the histogram 214 as indicated at a block 1222. Then the color name records in histogram are sorted by fractional count as indicated at a block 1224 to complete the query as indicated at a block 1226. It should be understood that other sorts can be provided based upon the requirements of the user.

It should be understood that when querying an image database by color name, the loops can be reordered. In specific cases, certain loops can be removed. For performance or program maintenance reasons, certain computations can be moved inside or outside certain loops. For example, if the color space transformation step is time consuming, an alternate embodiment would be to select all the pixels in the region, if one region, or in the image, if many regions, and place them in a list. Then transform all the pixels in the list. Then loop through the regions and color names.

It should be understood that multiple color name dictionaries can be used with each query. For example, there could be a name dictionary defining twenty color names, one defining two thousand color names, and a third defining two hundred thousand color names. On the query, the user could specify one, two or all dictionaries be used. Then a specific color would be returned as well as a color family. For example, the user could ask the question: Which of images in database have the most of color name "red" in region "top right"? And could get the answers image 54 33% "red" in region "top right" composed of 15% dark saturated burgundy, 12% dark grayish red and 5% medium grayish red. Image 78 28% "red" in region "top right" composed of 13% light bright pink, 11% medium pink, 7% medium bright pink, and 2% light grayish pink.

It should be understood that the volumes defined within the color name dictionaries could be overlapping and also the volumes may not cover the entire visible color space. It should be understood that the volume of the color name dictionary that contains a pixel or point in color space could be defined as the intersection of all volumes that contain the point in color space from a single color name dictionary or multiple color name dictionaries.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, a transmission type media such as a digital or analog communications link, or a similar computer program product. Recording medium 1302 stores program means 1304, 1306, 1308, 1310, on the medium 1302 for carrying out the methods of the preferred embodiment in the system 100 of FIG. 1.

A sequence of program instructions or a logical assembly of one or more interrelated modules defined by the recorded program means 1304, 1306, 1308, 1310, direct the computer system 100 for implementing computer color space with associated color names of the preferred embodiment.

While the present invention has been described with reference to the details of the embodiments of the invention shown in the drawing, these details are not intended to limit the scope of the invention as claimed in the appended claims.

What is claimed is:

1. A method for creating a color name dictionary comprising the steps of:
    identifying a predetermined color space;
    dividing said predetermined color space into a plurality of color space segments;
    assigning an associated color name to each of said plurality of color space segments; each said associated color name including a word or a phrase that constitutes a distinctive designation for said associated color space segment.

2. A method for creating a color name dictionary as recited in claim 1 wherein the step of identifying a predetermined color space includes the step of identifying a three-dimensional predetermined color space.

3. A method for creating a color name dictionary as recited in claim 2 wherein the step of dividing said predetermined color space into a plurality of color space segments includes the step of dividing a first dimension of said three-dimensional predetermined color space into a predefined number of hue segments.

4. A method for creating a color name dictionary as recited in claim 3 further includes the step of dividing a second dimension of said three-dimensional predetermined color space into a predefined number of chroma segments.

5. A method for creating a color name dictionary as recited in claim 4 further includes the step of dividing a third dimension of said three-dimensional predetermined color space into a predefined number of lightness segments.

6. A method for creating a color name dictionary as recited in claim 1 wherein the step of assigning a color name to each of said plurality of color space segments includes the step of storing a color name with boundary values defining each of said plurality of color space segments.

7. A method for creating a color name dictionary as recited in claim 1 wherein the step of dividing said predetermined color space into a plurality of color space segments includes the steps of identifying a set of color name boundaries in a three-dimensional color space; said identified set of color name boundaries including six boundary values to define concentric cylindrical segments.

8. A method for creating a color name dictionary as recited in claim 7 wherein the step of identifying a set of color name boundaries in a three-dimensional color space includes the steps of defining a color name volume by a low radius boundary value and a high radius boundary value, a low angle boundary value in the X-Y plane and a high angle boundary value in the X-Y plane, and a low boundary value Z coordinate and a high boundary value Z coordinate.

9. A method for creating a color name dictionary as recited in claim 1 wherein the step of dividing said predetermined color space into a plurality of color space segments includes the steps of identifying a set of color name boundaries in a three-dimensional color space; said identified set of color name boundaries including six boundary values to define spherical segments.

10. A method for creating a color name dictionary as recited in claim 1 wherein the step of dividing said predetermined color space into a plurality of color space segments includes the steps of identifying a set of color name boundaries in a three-dimensional color space; said identified set of color name boundaries including six boundary values to define curvilinear segments.

11. A method for creating a color name dictionary as recited in claim 1 wherein the step of identifying a predetermined color space includes the step of identifying a generally visually uniform color space.

12. A method for querying an image by color name comprising the steps of:

acquiring an image;

acquiring a pixel from said acquired image;

comparing said acquired pixel with a color name volume;

identifying at color name volume containing said acquired pixel; and identifying a color name for said identified color name volume; said color name including a word or a phrase that constitutes a distinctive designation for said identified color name volume.

13. A method for querying an image by color name as recited in claim 12 wherein said step of acquiring a pixel from said acquired image includes the step of transforming pixel coordinates from a device-dependent color space into a device-independent color space of a color name dictionary.

14. A method for querying an image by color name as recited in claim 12 wherein said step of comparing said acquired pixel with a color name volume includes the steps of acquiring volume coordinate values for said color name volume.

15. A method for querying an image by color name as recited in claim 12 wherein said step of comparing said acquired pixel with a color name volume includes the steps of receiving pixel coordinates in a device-independent color space of a color name dictionary and comparing said received pixel coordinates with boundary values of said color name volume.

16. A method for querying an image by color name as recited in claim 12 further includes the step of incrementing a pixel count for an identified color name volume.

17. A method for querying an image by color name as recited in claim 16 further includes the step of generating a color name histogram.

18. A method for querying an image by color name as recited in claim 17 further includes the step of sorting color name records contained in said color name histogram responsive to a predefined type of user query.

19. A method for querying an image by color name as recited in claim 17 further includes the step of sorting color name records contained in said color name histogram by a fractional count responsive to a predefined type of user query.

20. A method for querying an image by color name as recited in claim 17 wherein said step of acquiring a pixel from said acquired image includes the steps of identifying an image region within said acquired image.

21. A method for querying an image by color name as recited in claim 20 further includes the step of sorting color name records contained in said color name histogram responsive to a predefined type of user query.

22. A method for querying an image by color name as recited in claim 20 further includes the step of sorting color name records contained in said color name histogram by said image region and fractional count responsive to a predefined type of user query.

23. A computer program product for use in a computer system having a central processor for creating a color name dictionary, the computer program product comprising:

a recording medium;

means, recorded on the recording medium, for identifying a predetermined color space;

means, recorded on the recording medium, for dividing said predetermined color space into a plurality of color space segments;

means, recorded on the recording medium, for assigning an associated color name to each of said plurality of color space segments; each said associated color name including a word or a phrase that constitutes a distinctive designation for said associated color space segment.

24. A computer program product for use in a computer system as recited in claim 23 wherein said means, recorded on the recording medium, for dividing said predetermined color space into a plurality of color space segments include means, recorded on the recording medium, for identifying a set of color name boundaries in a three-dimensional color space; said identified set of color name boundaries including six boundary values to define concentric cylindrical segments.

25. A computer program product for use in a computer system having a central processor for querying an image by color name, the computer program product comprising:

a recording medium;

means, recorded on the recording medium, for acquiring an image;

means, recorded on the recording medium, for acquiring a pixel from said acquired image;

means, recorded on the recording medium, for comparing said acquired pixel with a color name volume;

means, recorded on the recording medium, for identifying a color name volume containing said acquired pixel; and means, recorded on the recording medium, for identifying a color name for said identified color name volume; said color name including a word or a phrase that constitutes a distinctive designation for said identified color name volume.

26. A computer program product for use in a computer system as recited in claim 25 further includes means, recorded on the recording medium, for generating a color name histogram.

27. A method for querying a point in color space by color name comprising the steps of:

acquiring a pixel;

comparing said acquired pixel with a color name volume;

identifying a color name volume containing said acquired pixel; and identifying a color name for said identified color name volume; said color name including a word or a phrase that constitutes a distinctive designation for said identified color name volume.

28. A method for querying a point in color space by color name as recited in claim 3 includes the steps of acquiring a next pixel within an image region and repeating said comparing and identifying steps; and incrementing a count value for said identified color name.

* * * * *